United States Patent [19]

Senda et al.

[11] 4,233,159
[45] Nov. 11, 1980

[54] SOLID-LIQUID SEPARATION ELEMENT AND APPARATUS

[75] Inventors: Teruo Senda; Mitsunobu Otani, both of Otsu, Japan

[73] Assignee: Toray Industries, Inc., Tokyo, Japan

[21] Appl. No.: 962,641

[22] Filed: Nov. 21, 1978

[30] Foreign Application Priority Data

Nov. 28, 1977 [JP] Japan .................................. 52-141688

[51] Int. Cl.³ .......................................... B01D 23/24
[52] U.S. Cl. ................................. 210/413; 209/273; 209/388; 210/483
[58] Field of Search ............... 210/407, 413, 498, 483; 209/273, 274, 281, 386–390

[56] References Cited

U.S. PATENT DOCUMENTS

| 311,622 | 2/1885 | Wehner | 209/390 X |
|---|---|---|---|
| 1,910,803 | 5/1933 | Leonard | 210/413 X |
| 2,994,434 | 8/1961 | Moseres | 210/413 |
| 4,097,382 | 6/1978 | Cruea | 210/456 |
| 4,113,626 | 9/1978 | Detcher | 209/281 |

Primary Examiner—William A. Cuchlinski, Jr.
Attorney, Agent, or Firm—Miller & Prestia

[57] ABSTRACT

A solid-liquid separation element which remarkably, improves the solid-liquid separation capacity of a solid-liquid separation device having the separation element therein is provided. In this separation element, guide members for accelerating the through-flow of the liquid are mounted on the back surface of a stationary inclined screen and, optionally, guide members for transporting solid materials are arranged on the surface of the screen so as to be substantially in parallel to each other and in a downward inclining direction from both edges of the screen. The solid-liquid separation apparatus having said separation element and a cleaning brush which is reciprocated in rubbing contact with the back surface of the screen is also provided. The range of the reciprocating motion of the brush is more than the width of the screen.

8 Claims, 11 Drawing Figures

SOLID-LIQUID SEPARATION ELEMENT AND APPARATUS

The present invention relates to a solid-liquid separation element, and more particularly, relates to a solid-liquid separation element suitable for use in a stationary inclined screen device.

The present invention also relates to a solid-liquid separation apparatus suitable for use in, for example, the separation of fine solid materials, such as, sludge derived from a biological treatment system of waste water and coagulated flock (e.g. inorganic colloid, organic colloid, activated sludge and the like coagulated by a coagulation agent).

Previously, a solid-liquid separation using an inclined flat type screen is generally carried out by uniformly feeding an aqueous slurry to be treated onto the surface of an inclined screen. The known inclined screens include perforated flat plates (e.g. punching metals) and those which are composed of a plurality of parallel spaced rows of bars, each having a V- cross sectional shape or having a square shape (e.g. wedge wires and the like). Such stationary type solid-liquid separation is based on a so-called "cross flow filtration" principle which effectively combines three forces, that is, the surface tension and gravity of the feeding liquid, and the slip (i.e. inertia force) of solid materials retained on the surface of the screen, with each other. In the known solid-liquid separation element, since the through-flow water, which has passed from the surface of the screen to the back of the screen, is conveyed along the back surface of the screen, the following disadvantages occur.

(1) The water which is conveyed along the back surface of the screen resists the through-flow of water which is newly to pass through the screen. Therefore the, amount of through-flow water per unit area of the screen (which is called "flux" hereinafter) cannot be maintained at a high level.

(2) In the instance where organic waste water is treated, since a large amount of slime is formed from microorganisms, due to conveyance of a large amount of water along the back of the screen, the screen becomes plugged-up very rapidly.

(3) Although solid-liquid separation is effected in the feeding area of the upper portion of the inclined screen, it becomes difficult to maintain a high concentration of solid materials in the discharging area of the lower portion of the inclined screen, due to the fact that the water which is conveyed along the back surface of the screen is again united with the separated solid materials.

The objects of the present invention are to obviate the above-mentioned disadvantages of the conventional solid-liquid separation elements and to provide solid-liquid separation element having an improved solid-liquid separation capacity.

Another object of the present invention is to provide an improved solid-liquid separation apparatus provided with an efficient cleaning means, particularly an apparatus which is suitable for use in the solid-liquid separation of a waste slurry containing sludge and BOD components derived from a biological water treatment system.

Other objects and advantages of the present invention will be apparent from the following description.

In accordance with the present invention, there is provided a solid-liquid separation element comprising:
(i) a screen having a plurality of openings therein, and;
(ii) guide members, mounted on the back surface of the screen, for accelerating the through-flow of the liquid.

In accordance with the present invention, there is also provided a solid-liquid separation apparatus comprising: (i) a solid-liquid separation element composed of a screen having a plurality of openings therein and guide members for accelerating the through-flow of liquid mounted on the back surface of the screen, and; (ii) a means for cleaning the screen which includes a brush. The said brush is reciprocated in rubbing contact with the back surface of the screen and the range of the reciprocating motion of the brush is more than the width of the screen.

The term "openings" used herein means slits, perforations, holes, slots and the like.

The present invention will be better understood from the following description with reference to the accompanying drawings, but is by no means limited to these drawings, in which.

Figures 1, 2:
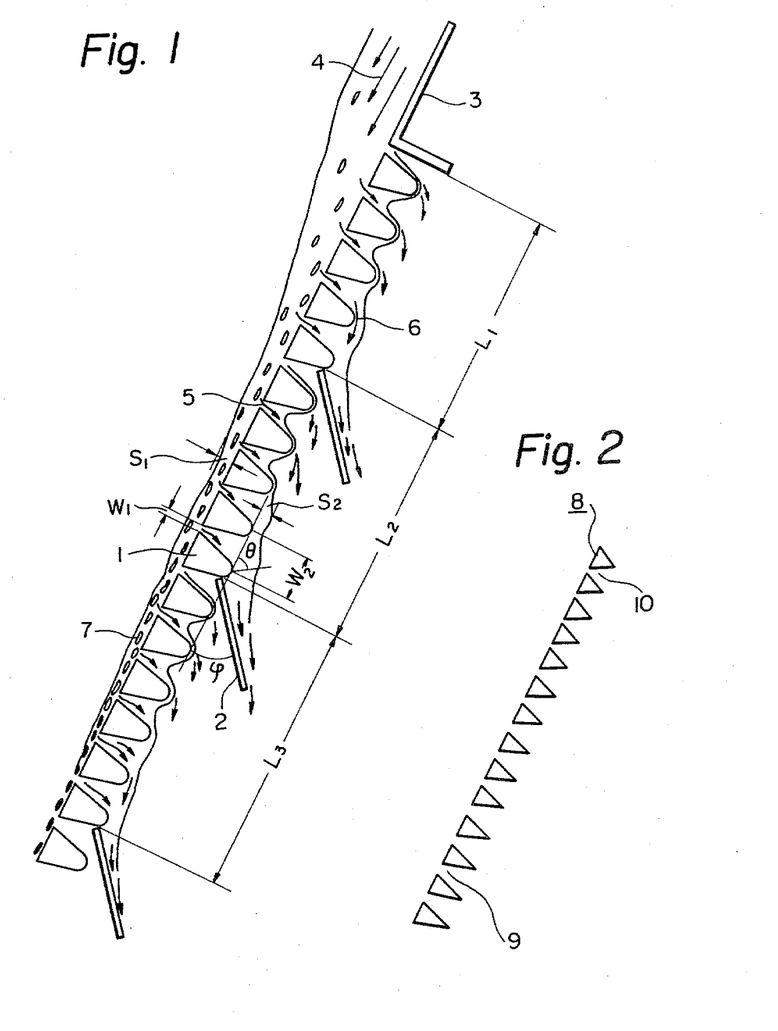
FIG. 1 is a schematic sectional view illustrating one embodiment of the present solid-liquid separation element.
FIG. 2 is a schematic sectional view illustrating one embodiment of a plurality of parallel spaced rows of bars which form the screen of the present invention.

The screen used in the present solid-liquid separation element is composed of a plurality of substantially parallelly spaced rows of metallic or plastic bars or is composed of a metallic or plastic plate having a plurality of openings therein. Preferable the screen is one of those which comprise a series of substantially parallel spaced wedge wires 1 made from stainless steel as illustrated in FIG. 1. The arrangement of the wedge wires 1 is preferably such that they form a substantially flat surface over which a slurry 4, to be separated, flows. In lieu of metallic bars, such as stainless steel wedge wires, plastic bars made from, for example, polyethylene, polypropylene, polyamide, polyester can be also employed. In the case where plastic bars are employed, since water tends to flow along the surface of the screen without passing through the openings to the back surface, the plastic bars should be previously subjected to surface oxidation treatment with an acidic solution of potassium permanganate or potassium bichromate, or be submerged in water at room temperature for approximately 20 days. Plastic articles can be used for the screen of the present invention after such a pre-treatment. As mentioned above, although a metallic (or plastic) plate, such as a punching metal, having perforations can be used, a wedge wire type screen is preferable in view of the amount of through-flow water it permits per unit area of the screen (i.e. flux).

The separation element of the present invention is usually installed with an angle of inclination of from 30° to 80°.

Referring to FIG. 1, the construction and attaching of the guide members for accelerating the through-flow of the liquid will now be described with respect to, for example, a flat screen which is manufactured by equally spacing a plurality of wedge wires, each having a V-cross sectional shape.

In FIG. 1, the reference numeral 1 denotes a screen bar having a V- cross sectional shape (i.e. a wedge wire), a guide member 2 for accelerating the through-flow of the liquid, a feed plate 3 for guiding to the screen a slurry to be separated and a feed slurry flow 4; 5 denotes water passing through the screen (i.e. the through-flow water), 6 denotes through-flow water which is conveyed along the back surface of the screen and 7 denotes solid materials which slide down screen surface.

Assuming that $S_1$ is the thickness of the solid-liquid flow on the screen surface and $S_2$ is the thickness of the through-flow water which is conveyed along the back surface of the screen (i.e. an average distance between the free water surface and the plane connecting the tops of the back surface of the screen), $S_1$ gradually decreases with the through-flow of the liquid and $S_2$ gradually increases due to the viscosity and surface tension of the liquid itself. Assuming that $W_2$ is a distance between the tops of the back surface of the screen and $\theta$ is an angle formed between a horizontal plane and the screen, in the case where $S_2$ satisfies the condition:

$$S_2/\sin \theta \geq W_2 \cdot \cos \theta$$

the through-flow liquid 5 is conveyed along the back surface of the screen. For this reason, the interface force derived from the wetting of the back surface of the screen with through-flow water 6 functions as an additional resistance force against the through-flow of the liquid, in addition to the increase in the fluidity resistance due to the surface tension. Thus, a decrease in the flux occurs.

Accordingly, in order to obviate the above-mentioned fluidity resistance, it is necessary to attach or place the guide members 2, for accelerating the through-flow of the liquid to be separated, in the neighborhood of such positions that $S_2$ satisfies the equation:

$$S_2/\sin \theta = W_2 \cdot \cos \theta$$

In fact, the positions where $S_2$ satisfies this equation vary depending on a width $W_1$ of the slit (i.e. a minimum distance between the adjacent two bars illustrated in FIG. 1), the distance $W_2$, viscosity of the through-flow liquid, density of the through-flow liquid, water load of the screen and the like. For instance, in the case of a screen having a slit width $W_1$ of 1 mm or less, which is suitable for use in the separation of relatively fine solid materials, the preferable positions where the guide members are attached are as follows. That is, assuming that $L_1$ is a distance between the edge of the slurry feed plate 3 and the first guide member, $L_2$ is a distance between the first and second guide members, $L_3$ is a distance between the second and third guide members and so on, $L_1$ is generally 30 cm or less, and preferably 10 cm or less, and $L_2$, $L_3$ and so on are generally equal to or are more than $L_1$.

The length h of the guide member 2 (in the case where a curved plate or a plate having various cross sectional shapes is used, the length h means a straight distance between the back surface of the screen and the front edge of the guide member) is generally 2 mm or more, and preferably 5 mm or more, although it depends on the magnitude of the flux. The maximum length h of the guide member 2 is generally 50 mm. The width of the guide member 2 preferably extends over the entire width of the screen. The shape of the guide member 2 may be selected from a flat plate, a curved plate, a plate having, for example, a triangle cross sectional shape and the like. The angle $\phi$ formed between the top face of the back of the screen and the central line of the guide member (i.e. a line connecting the point farthest away from the screen and the point of contact between the screen and the guide member) may be 90° or less, and preferably 60° or less. When bars each having a square-cross sectional shape are employed as a screen material or a punching metal is used as a screen material, the construction and attachment of guide members for accelerating the through-flow of the liquid can be similar to those of the above-mentioned wedge wire type screen. The guide members 2 can be attached to the back of the screen by any suitable means, such as welding, a bolt means, or the like.

As illustrated in FIG. 2, the area of the openings 9 formed in the lower portion (or downstream portion) of the screen 8 can be advantageously larger than that of the openings 10 in the upper portion (or upstream portion) of the inclined screen 8. Thus, stable separation and concentration of solid materials, such as S.S. (suspended solids), contained in a slurry derived from a biological water treatment system can be effected. For obtaining optimum results, the ratio of the opening area of the lower portion of the screen to that of the upper portion is generally 1.1 or more, and is preferably within the range from 1.3 to 2.0.

The screen 8 can also be composed of three or more portions having different opening areas, provided that the opening area of the lower portion of the adjacent two portions is larger than that of the upper portion. More preferably, the opening areas of the screen can be gradually or successively increased from the upstream edge of the screen to the downstream edge of the screen. In this cases, any adjacent portions of the screen should be within the specified limitation with respect to the ratio of the opening areas mentioned above. Although, in the embodiment illustrated in FIG. 2, the screen is formed by various bars having different sizes, it should be noted that bars having the same size can be also used for assembling a screen.

Figure 3:
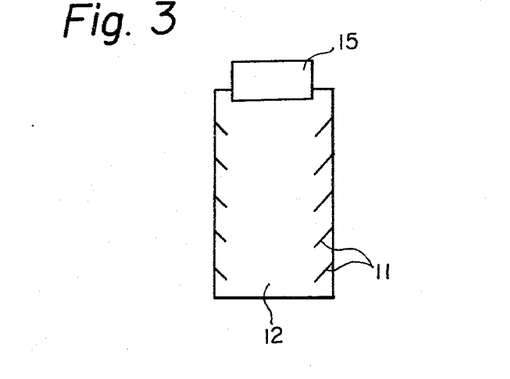
FIG. 3 is a schematic front view illustrating one embodiment of the present solid-liquid separation element in the solid-liquid separation assembly of the present invention.
Figure 4:
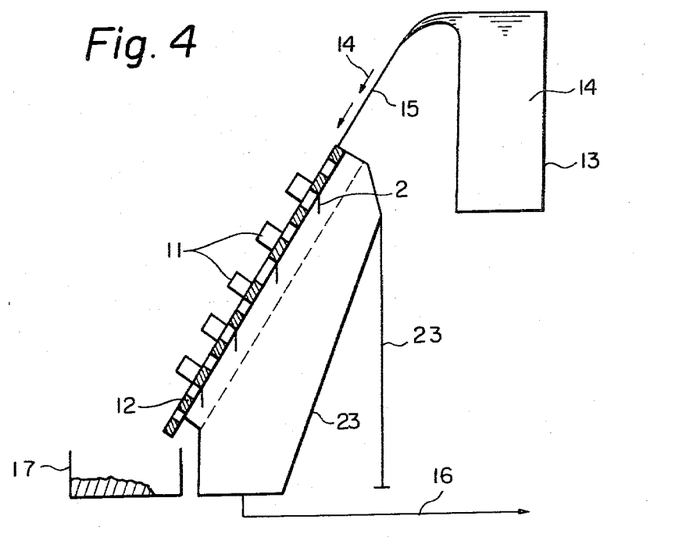
FIG. 4 is a schematic sectional view of the solid-liquid separation assembly of FIG. 3.

As illustrated in FIGS. 3 and 4, in a preferred embodiment of the present invention, guide members 11 for transporting solid materials are arranged on the surface of the screen 12 so that they are substantially in parallel to each other and in a downward inclining direction from both edges of the screen 12. The screen 12 may be a metallic or plastic plate having a plurality of openings therein and a plurality of parallelly spaced rows of metallic or plastic bars over which the slurry flows.

A slurry 14 contained in a feed vessel 13 is fed through a feeding plate 15 over a surface of the screen 12, where solid materials are separated from liquid. The separated solid materials slip down the surface of the screen into a solid receiver 17. On the other hand, separated liquid 16 passes through the openings of the screen 12 and is discharged from a screen unit. In such solid-liquid separation process, according to this embodiment of the present separation element, since the guide members 11 for transporting solid materials are placed on the surface of the screen 12 by a suitable conventional means, such as welding, bonding or a bolt means, the guide members 11 function in such a way that suspended solids moving toward the side wall of the screen 12 are returned to the center of the screen surface. In addition, water spray nozzles (not shown) which assist the function of the guide members 11 and also clean (i.e. remove solids plugging up the openings of the screen) can be arranged at both sides of the screen in a similar manner to the arrangement of the guide members 11. Each guide member 11 can advantageously be a flat plate having a length of 5 mm through 50 mm and a width of 5 mm through 50 mm. Distances between any two adjacent members 11 can be individually 30 mm through 300 mm, although they depend on the magnitude of the flux and the nature of the solids. In addition, an angle formed between the flow direction of the screen and the guide member 11 is generally within the range of from 10° to 90°.

As schematically, illustrated in FIG. 4, the solid-liquid separation element of the present invention is suitably supported by a support member 23 in such a manner that the screen 12 is fixed in an inclined condition.

Figure 5:
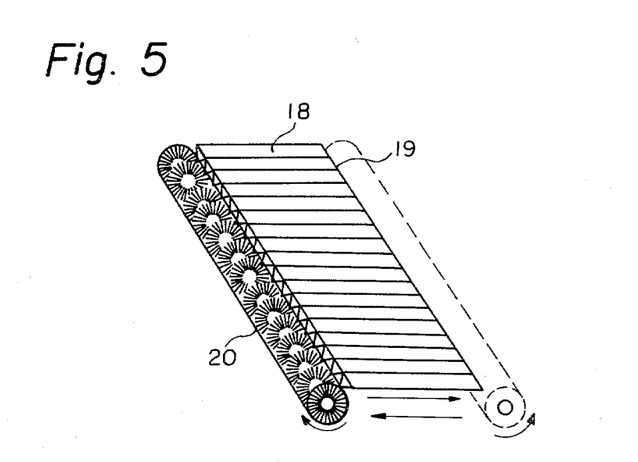
FIG. 5 is a schematic perspective view of one embodiment of the screen and the cleaning brush of the present solid-liquid separation apparatus.
Figure 6:
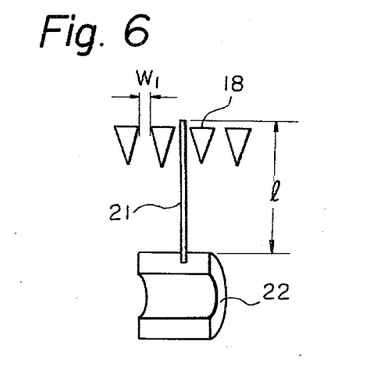
FIG. 6 is a schematic view illustrating the correlation between the rotating brush and the wedge wires in the present solid-liquid separation apparatus.
Figure 7:
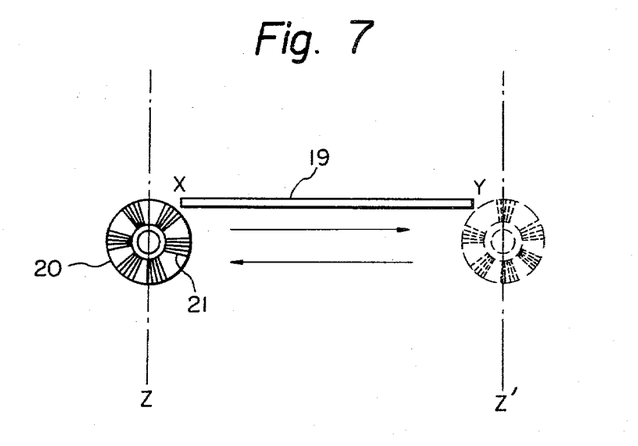
FIG. 7 is a schematic sectional view illustrating the correlation between the rotating brush and the screen in the present solid-liquid separation apparatus.

Reference will now be made to FIGS. 5, 6 and 7, where one embodiment of the present solid-liquid separation apparatus is partially illustrated. As mentioned hereinabove, in the case where fine solid materials are separated from a slurry containing, for example, biological sludge and B.O.D. (Biochemical Oxygen Demand) components, which is derived from biological water treatment system, the plugging rate of the screen openings with solids remarkably increases due to the use of the screen having openings of 0.5 mm or less, especially 0.2 mm or less. Therefore, conventional cleaning means, which have been heretofore used for the solid-liquid separation apparatus, cannot be practically used.

According to the preferred embodiment of the present invention, as illustrated in FIG. 5, the solid-liquid separation apparatus comprises a rotating brush 20 arranged on the back surface of a screen 19, which is formed by a plurality of parallel spaced rows of wedge wires 18. These wedge wires 18 are spaced equally or at predetermined distances and fixed to each other by a suitable means, for example, by electric welding or by winding them onto supporting rods. The rotating brush 20 is reciprocated in rubbing contact with the back surface of the inclined screen 19 between one end and the other end of the screen 19, as indicated by an arrow in FIG. 5. Thus, the plugged openings (i.e. slits in this case) are cleaned by the bristles 21 of the rotating brush 20. The range of the reciprocating motion of the rotating brush 20 is generally beyond the two ends of the screen 19. The rotating direction of the brush 20 is reversed each time the brush 20 changes its moving direction. Therefore, when the rotating brush 20 reaches one end of the screen 19, the rotating direction of the brush 20 is reversed and the brush 20 is moved in the opposite direction.

Referring to FIG. 6, a large number of bristles 21 (although one bristle is shown in FIG. 6) are embedded into a rotating brush cylinder 22. The length l of the bristle 21 is such that, when the brush 20 is set, the top of the bristle 21 projects out through the slit width $W_1$ formed by wedge wires 18. The length l of the bristle 21 means the distance between the top of the bristle and the surface of the brush cylinder 22. The length l of the bristle 21 can be generally 40 mm or less, and preferably 5 mm through 30 mm. When the length l of the bristle is more than 40 mm, the bending strength of the bristle 21 unpreferably decreases. The projection length of the bristle 21 from the surface of the screen 19 is generally 0.5 mm through 5 mm. The mean diameter of the bristle 21 must be less than the width $W_1$, and preferably be $0.7 \times S$ or less. Usually, the diameter of the bristle 21 is not more than 0.2 mm, for example, 0.03 to 0.15 mm.

The bristle 21 can be advantageously made of polyester, such as poly(ethylene terephthalate), poly(butylene terephthalate) and the like, although other plastics and animal hair can be used. This is because, since elastic strength of polyester is higher than that of nylon, polypropylene, poly(vinyl chloride) and animal hair by several through several tens of times, the diameter of the bristle 21 can be made small so that cleaning of fine slits can be effected. Polyester also has the advantages that the decrease in the strength thereof when water is absorbed is small and polyester is not subject to biological degradation. However, polyester does have the disadvantages that the flex recovery thereof is small and, therefore, polyester tends to get bent. Never-the-less, this disadvantage of polyester can be obviated by rotating and reciprocating the brush 20 over the range beyond the width of the screen 19. Thus, in the case where the brush 20 is outside of the edges of the screen 19, the bending stress which was applied to the bristle 21 is removed and the bristle 21 recovers its straight orientation. Accordingly, the brush 20 can be continuously used. It should be noted that a tapered bristle can be also used.

The brush 20 is advantageously a rotating brush, which is rotated around an axis parallel to the plane of the screen by a suitable rotating means (not shown in the drawings) such as motor driving or compressed air cylinder driving. When the rotating brush is used, the following advantages are presented.

(1) Since the bending force applied to the bristle is immediately removed, the bristle tends not to be permanently bent.

(2) Since a good contact angle between the screen surface and the bristle is always kept, the efficiency of the cleaning is improved.

(3) Since all bristles uniformly contact the screen, the brush is not partially worn out.

These advantages are more remarkably presented when the rotating direction is reversed each time the brush changes its moving direction.

As illustrated in FIG. 7, the bristles 21 of the reversible rotating brush 20 are not in contact with or only slightly in contact with the screen 19 when the brush 20 reaches either end of its reciprocating motion, indicated by arrows, so that the rubbing force applied to the bristles 21 is removed and the bristles 21 are in a freely extending condition. For ensuring such operation, the distance Z-Z' between the end positions of the axis of the rotation of the brush 20 must be larger than the width X-Y of the screen 19.

Figure 8:
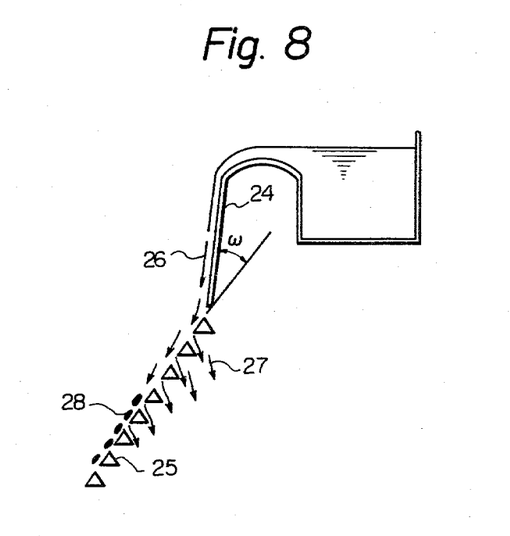
FIG. 8 is a schematic sectional view illustrating the correlation between the screen and the plate for feeding a slurry to be separated in one embodiment of the present solid-liquid separation apparatus.

According to the present invention, as illustrated in FIG. 8, there is further provided a solid-liquid separation apparatus in which an angle $\omega$ between the surface of a screen 25 and a feed plate 24, for supplying a slurry 26, is preferably within the range of from approximately 2° to approximately 60°, and more preferably from 5° to 30°. It has been found that, if the feed plate 24 and the surface of the screen 25 are both in one plane, the following phenomena are observed.

(1) When projections such as plugged solids are formed in the slits of the screen 25 close to the feed plate 24, the feeding slurry 26 collides with the projections, whereby the slurry 26 is splashed and runs over the surface of the screen 25.

(2) Since an attractive force is generated when the feeding slurry 26 moves from the feed plate 24 to the screen 25, air is introduced as bubbles from the back of the screen 25 into the slurry present on the surface of the screen 25.

These phenomena clearly lower the water treatment capacity of the separation apparatus. However, it has been found that, when the angle θ between the feed plate 24 and the surface of the screen 25 is between approximately 2° and approximately 30°, no air bubbles are introduced into the slurry on the screen, and also, no substantial splash of the feeding slurry 26 on the screen 25 is generated when the slits of the screen 25 close to the feed plate 24 are moderately plugged. As a result, more effective and stable operations of the present solid-liquid separation apparatus can be effected when the angle θ is between approximately 2° and 30°.

The present invention will be further illustrated by, but is by no means limited to, the following Examples.

EXAMPLE 1

Waste water derived from a food plant was independently treated for separating suspended solids (S.S.) from the water by using two screens, each having the same size (15 cm wide and 65 cm long) and made of punching metals having slits of 0.4 mm in width. One of the screens had six guide plates, for accelerating the through-flow of the liquid, fixed on the back of the screen and the other had no guide plate. The screens were installed with an angle of inclination of 60°. The guide plates, each made of a poly(vinyl chloride) flat plate having dimensions of 15 cm wide × 1.5 cm long × 1 mm thick, were attached in close contact with the back surface of the one screen. The distances between the adjacent guide plates were equally 10 cm and the angles between the guide plates and the downward side of the screen were 60°.

Figure 9:
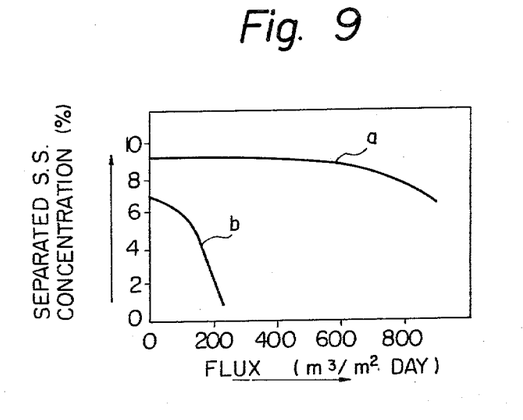
FIGS. 9 through 11 are graphs showing the results of the Examples described hereinafter.

The separation test results are indicated in FIG. 9. In FIG. 9, a curve (a) shows the case in which the guide plates are attached and a curve (b) shows the case in which no guide plate is used. It is clear from the comparison of the curves (a) and (b) that the use of the guide plates ensure a high flux and high S.S. concentration separation operation.

EXAMPLE 2

Discharged water containing waste sludge produced by the treatment of restaurant waste water in a contact-oxidation type biological fixed film reactor was individually fed to two screens in the same manner as described in Example 1. The screen was manufactured from wedge wires, each having a V-cross shape, which were arranged in a close and equally spaced relationship and in a direction transverse to slurry flow thereacross. The width of the slits was 0.25 mm and the area of the screen was 0.24 m² (i.e. 30 cm wide and 80 cm long). The screens were installed at an angle of inclination of 60°. Eight guide members made of stainless steel flat plates, each having dimensions of 30 cm wide × 1.5 cm long × 1 mm thick, were attached to the back of one of the screens. The distances between the adjacent guide plates were equally 10 cm and the angles between the guide plates and the downward side of the screen were 50°. No guide plate was attached to the other screen.

Figure 10:
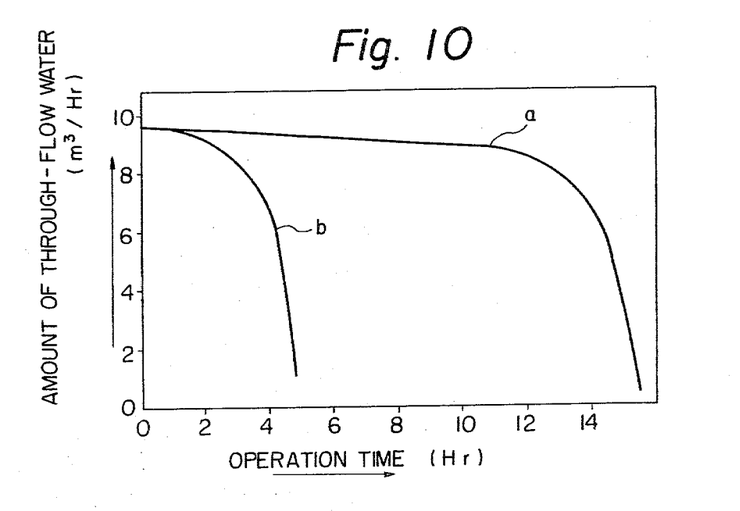

The separation test results are indicated in FIG. 10. In FIG. 10, a curve (a) shows the case in which the guide plates are attached and a curve (b) shows the case in which no guide plate is used. As is clear from FIG. 10, in the case where the amount of water conveyed along the back of the screen is greatly decreased by the attachment of the guide plate (see curve a), the operational time before the amount of the through-flow water rapidly decreases (that is, before the slits of the screen are plugged) can be remarkably entended. That is, as in this Example, in the case where waste water mainly containing organic materials are treated by the screen, although the surface of the screen is not easily plugged by biological films due to the frictional force produced when the separated solids slip on the surface of the screen, the back surface of the screen is easily plugged by biological films due to the absence of the above-mentioned frictional force. For this reason, when no guide plate is attached to the back of the screen, the slits of the screen are plugged and, therefore, a decrease of the flux is observed. In addition, the amount of the biological film generated largely depends on the amount of water conveyed along the back of the screen, although it also depends on BOD content of slurry to be treated.

EXAMPLE 3

Figure 11:
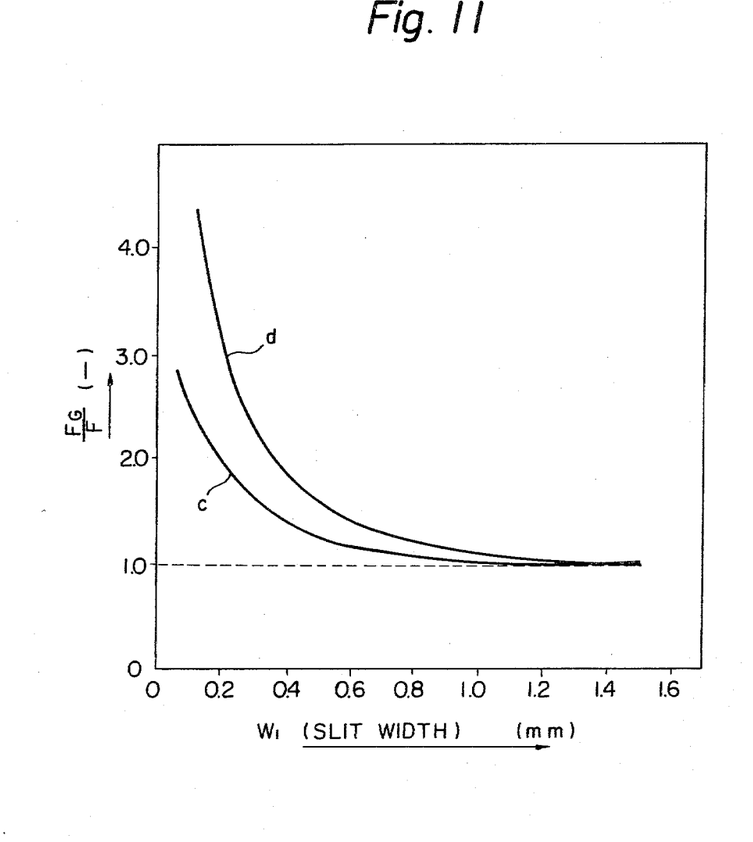

The aqueous slurry used in Example 2 was subjected to separation tests by using twelve screens with and without guide members for accelerating the through-flow of water. The screens used were identical to those used in Example 2, except that the width of the slits (i.e. $W_1$ in FIG. 1) was changed to 0.15 mm, 0.25 mm, 0.5 mm, 0.75 mm, 1.0 mm or 1.5 mm. The results are indicated in FIG. 11 wherein the ratio of a flux $F_G$ (i.e. a flux obtained from the screen with the guide plate) to a flux F (i.e. a flux obtained from the screen with no guide plate) is plotted against the slit width $W_1$. In FIG. 11, a curve c represents the case where eight guide plates are attached to the back of the screen with an equal distance of 10 cm therebetween, and a curve d represents the case where eight guide plates are attached to the back of the screen as follows.

| Plate | Distance (cm) |
| --- | --- |
| No. 1 / No. 2 | 5 |
| No. 2 / No. 3 | 5 |
| No. 3 / No. 4 | 7.5 |
| No. 4 / No. 5 | 7.5 |
| No. 5 / No. 6 | 10 |
| No. 6 / No. 7 | 15 |
| No. 7 / No. 8 | 20 |

As is clear from the curves c and d in FIG. 11, the effect of the guide plate is especially remarkable in the case where the slit width of the screen is 0.5 mm or less and the effect of the guide plate is more remarkable in the case where the distances between the adjacent guide plates of the upstream side of the screen are smaller than those of the downstream side.

EXAMPLE 4

Waste water derived from a ceramics plant, after being coagulated with a coagulation agent, was subjected to separation tests by using screens having a variety of slit widths. The waste water contained coagulated alumina colloids and its S.S. content was 270 ppm. The screens used in this Example were identical to that of Example 2-(a) in which the guide plates are attached, except that the slit widths were changed. The results are indicated in the following Table 1.

TABLE 1

| Slit Width (mm) | S.S. Content of Treated Water (ppm) |
| --- | --- |
| 0.1 | 0.5 |
| 0.15 | 30 |
| 0.3 | 100 |
| 0.5 | 200 |
| 1.0 | 270 |

(Remarks)
The amounts of the through-flow water were similar to those of Example 2 (see FIG. 10).

EXAMPLE 5

Waste water derived from a synthetic fiber plant and containing 4000 ppm (S.S. content) of coagulated activated sludge was subjected to separation tests by using the screens used in Example 4. The results are indicated in the following Table 2.

TABLE 2

| Slit Width (mm) | S.S. Content of Treated Water (ppm) |
| --- | --- |
| 0.1 | 15 |
| 0.15 | 30 |
| 0.3 | 500 |
| 0.5 | 3000 |
| 1.0 | 4000 |

(Remarks)
The amounts of the through-flow water were similar to those of Example 2 (see FIG. 10).

From the results shown in Tables 1 and 2, it is obvious that a screen having a slit width of not more than 0.2 mm is effective with respect to the waste water that was treated.

EXAMPLE 6

Treated waste water obtained from a biological film type oxidation contactor in which domestic waste water was treated, was subjected to separation tests by using a conventional and the present screens, the specifications of which screens are indicated in the following Table 3.

TABLE 3

|  |  | Slit Width (mm) | Screen Length (mm) | Inclination Angle |
| --- | --- | --- | --- | --- |
| Conventional Type | 1st Portion | 0.20 | 300 | 70° |
|  | 2nd Portion | 0.20 | 300 | 60° |
|  | 3rd Portion | 0.20 | 300 | 50° |
| Present Invention | 1st Portion | 0.15 | 300 | 60° |
|  | 2nd Portion | 0.20 | 300 | 60° |
|  | 3rd Portion | 0.30 | 300 | 60° |

(Remarks)
1. The screens were made from wedge wires as described in Example 2.
2. No guide plate for accelerating the through-flow of water was attached.

The test results are indicated in the following Table 4.

TABLE 4

|  | S.S. | | Removal (%) | Concentrated S.S. Conc. (%) | Maximum Capacity (Water Amount) |
| --- | --- | --- | --- | --- | --- |
|  | Inlet (ppm) | Outlet (ppm) | | | |
| Conventional Type | 75 | 19 | 75 | 2.8 | 300 t/Day |
| Present Invention | 75 | 10 | 85 | 4.2 | 360 t/Day |

(Remarks)
Although the back surfaces of both screens were equally cleaned with the same type of brushes, one half of the slits of the conventional type screen, especially in lower portion, were plugged in 9 days, whereas no plugging occurred in the screen of the present invention during 50 days of continuous operation.

What we claim is:

1. A solid-liquid separation apparatus for use in the treatment of waste water comprising:
   (a) a solid-liquid separation element composed of a screen having a plurality of openings therein and guide members mounted on the back surface of said screen for accelerating the through-flow of the liquid, which is conveyed along the back surface of said screen, said guide member being mounted so that $S_2$ satisfies the equation $$S_2/\sin\theta < W_2\cdot\cos\theta$$

wherein $S_2$ is the thickness of the through-flow water which is conveyed along the back of said screen, $W_2$ is the distance between the tops of the back surface of the screen and $\theta$ is an angle formed between a horizontal plane and the screen, and
   (b) a means for cleaning the screen, said cleaning means having a brush, said brush adapted for reciprocation in rubbing contact with the back surface of the screen, and the range of reciprocating motion of said brush being more than the width of said screen.

2. A solid-liquid separation apparatus in accordance with claim 1, wherein said brush is a rotating brush.

3. A solid-liquid separation apparatus in accordance with claim 2, wherein the bristles of said rotating brush are polyester bristles having an effective length of not more than 40 mm and a diameter of not more than 0.2 mm.

4. A solid-liquid separation apparatus in accordance with claim 1, wherein the angle formed between the screen surface and the plane of a plate adapted for feeding a slurry to be treated is within the range of from approximately 2° to approximately 60°.

5. A solid-liquid separation apparatus in accordance with claim 1, wherein said screen having downstream and upstream portions, the area of each opening formed in the downstream portion of said screen is larger than that in the upstream portion of said screen.

6. A solid-liquid separation apparatus in accordance with claim 1 or 5, wherein the guide members for transporting solid materials are arranged on the surface of said screen so as to be substantially parallel to each other and in a downward inclining direction from both edges of the screen.

7. A solid-liquid separation apparatus in accordance with claim 1, wherein said openings are slits each having a width of 0.5 mm or less.

8. A solid-liquid separation apparatus in accordance with claim 1, wherein said screen having upstream and downstream portions, and the distance between adjacent guide members of the upstream side of the screen are smaller than those of the downstream side thereof.

* * * * *